July 23, 1940.  B. W. GANDRUD  2,209,077
EGG TESTER
Filed June 2, 1939
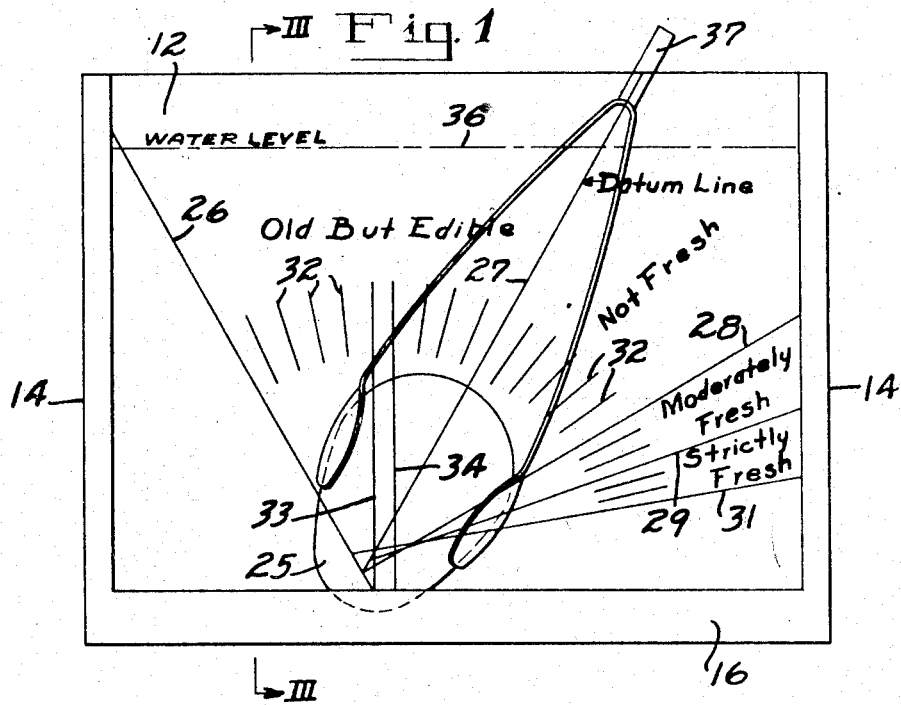
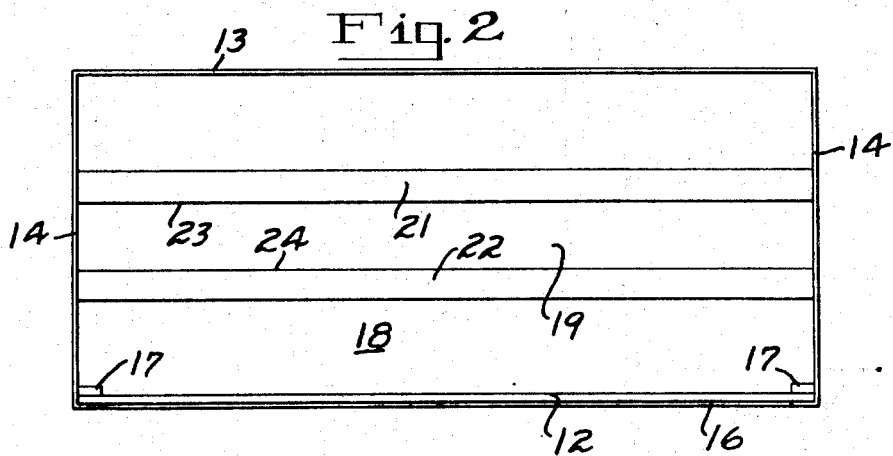
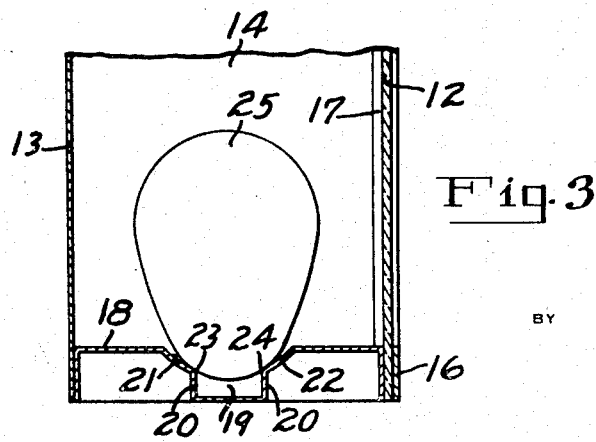
INVENTOR
BENNIE W. GANDRUD
BY Johnston & Jennings
ATTORNEYS

UNITED STATES PATENT OFFICE 2,209,077

EGG TESTER

Bennie W. Gandrud, Tuscaloosa, Ala.

Application June 2, 1939, Serial No. 277,027

2 Claims. (Cl. 265—44)

This invention relates to an improved device for determining the freshness of eggs.

One object of my invention is to provide an egg tester in which the eggs to be tested are immersed in a vessel containing a liquid and their freshness visibly indicated by comparing the position assumed by the major axis of the egg with suitable markings placed on a transparent wall of the vessel.

Another object of my invention is to provide an egg tester comprising a vessel having a transparent wall with lines thereon, said lines being so positioned that an egg, when properly placed to start, assumes a position with its major axis parallel to a line properly marked to indicate its condition.

Another object of my invention is to provide an egg tester comprising a vessel having a bottom with means thereon whereby the egg to be tested is caused to assume a position with its major axis in a plane parallel with a transparent wall of the vessel, so that accurate readings of the angle of the axis may be taken by comparison with lines on the transparent wall.

The above mentioned and other important features of my invention are illustrated in the accompanying drawing forming a part of this application, in which Fig. 1 is a front elevation showing an egg in position to be tested;

Fig. 2 is a plan view; and

Fig. 3 is a fragmentary sectional view taken along the line III—III of Fig. 1.

Referring to the drawing, I show a rectangular vessel having at least one transparent wall 12, formed of any suitable transparent material, though it will be apparent that the entire vessel may be made of transparent material. There is also a rear wall 13, and end walls 14. The transparent wall is held in leakproof engagement by means of a marginal frame 16 and vertical posts 17.

I provide the vessel with a bottom 18 having formed therein a longitudinally extending slot or trough 19. As shown, the trough has vertical walls 20, which are joined to the bottom 18 by means of downwardly sloping arcuate sections 21 and 22. This construction provides two sharp edges 23 and 24 against which the small end of an egg 25 is placed. These edges act as aligning edge supports which, though they offer no resistance to the rolling of an egg, nevertheless they cause the egg to assume a position with its major axis in a plane parallel to the transparent wall 12, when its other end is raised by the water, as will be explained. It will be noted that the trough 19 provides a space to accommodate the rounded end of the egg while it is being supported on the edges 23 and 24.

By reference to Fig. 1, it will be seen that the transparent wall 12 is provided with long lines 26, 27, 28, 29 and 31, a number of short lines 32 dividing the spaces between the long lines, and two vertical lines 33 and 34. The space between the lines 29 and 31 is marked "Strictly fresh"; that between lines 28 and 29 "Moderately fresh"; that between lines 27 and 28 "Not fresh"; and that between lines 26 and 27 "Old but edible."

It will be noted that none of the lines come to a common point on the line 27, marked "Datum line," and that when an egg is placed with its center line parallel to line 27 and moves horizontally and angularly, due to rolling on edges 23 and 24, the line indicating its freshness will be approximately parallel to the major axis of the egg when it comes to rest. This affords a more accurate reading, as it is easier to ascertain the angle between the horizontal and the axis of the egg if the line indicating that angle is parallel and in line with the axis.

It will be noted that the datum line is approximately midway between the extreme positions which an egg may assume. The advantage in so placing it is that an egg placed with its axis parallel to the datum line has a minimum distance to move to indicate its condition. It accordingly acquires little velocity of movement and does not jump back and forth and get out of place, as might be the case if placed otherwise.

The operation of the device is as follows: The vessel is filled with enough water to cover an egg in any position it may assume, as up to line 36. In order not to wet the hand, tongs 37 may be used to place the egg with its small end in trough 19, resting on the edges 23 and 24, and with its major axis parallel to the datum line. The egg is then released, and due to the difference between the specific gravities of the opposite ends of the egg, it will assume a position that will indicate its freshness. This difference increases as the age of the egg increases. For instance, if the egg is strictly fresh it will assume a position with its major axis lying between lines 29 and 31; if moderately fresh, with its axis between 28 and 29; if not fresh, with its axis between 27 and 28; and if old but edible it will stand on end, and, not being stable in that position, may swing over to the left of the vertical line 33, in which case its freshness is indicated by line 26.

By providing the trough 19, the edges 23 and 24, and the arrangement of the lines as above explained, I am able to ascertain very accurately the freshness of the egg, for since one of the lines on the transparent wall is practically parallel to the axis of the egg in any condition, its condition can be seen at a glance.

While I have shown my invention in but one form, it will be obvious to those skilled in the art that it is not so limited, but is susceptible of various changes and modifications, without departing from the spirit thereof, and I desire, therefore, that only such limitations shall be placed thereupon as are specifically set forth in the appended claims.

What I claim is:

1. An egg tester comprising a vessel adapted to contain a liquid and having a transparent wall to indicate the freshness of an egg when immersed in the liquid, a bottom in the vessel, and a trough in the bottom having edges parallel to each other and to said transparent wall adapted to support an egg for tilting while holding its major axis in a plane parallel to the transparent wall.

2. An egg tester comprising a vessel adapted to contain water and having a transparent wall, a datum line on the transparent wall, a plurality of other lines intersecting the datum line at different points and so positioned that the major axis of an egg, when set parallel to and directly behind the datum line to start, will come to rest and be approximately parallel to and directly behind one of the other lines in any other angular position assumed by the major axis, a bottom in the vessel, and a trough in the bottom having aligning edges parallel to each other and to said transparent wall and adapted to support an egg so as to allow it to oscillate only with its major axis lying in a plane parallel to the transparent wall.

BENNIE W. GANDRUD.